No. 818,868. PATENTED APR. 24, 1906.
M. L. S. & W. T. BUCKNER.
FILTER.
APPLICATION FILED JULY 3, 1905.
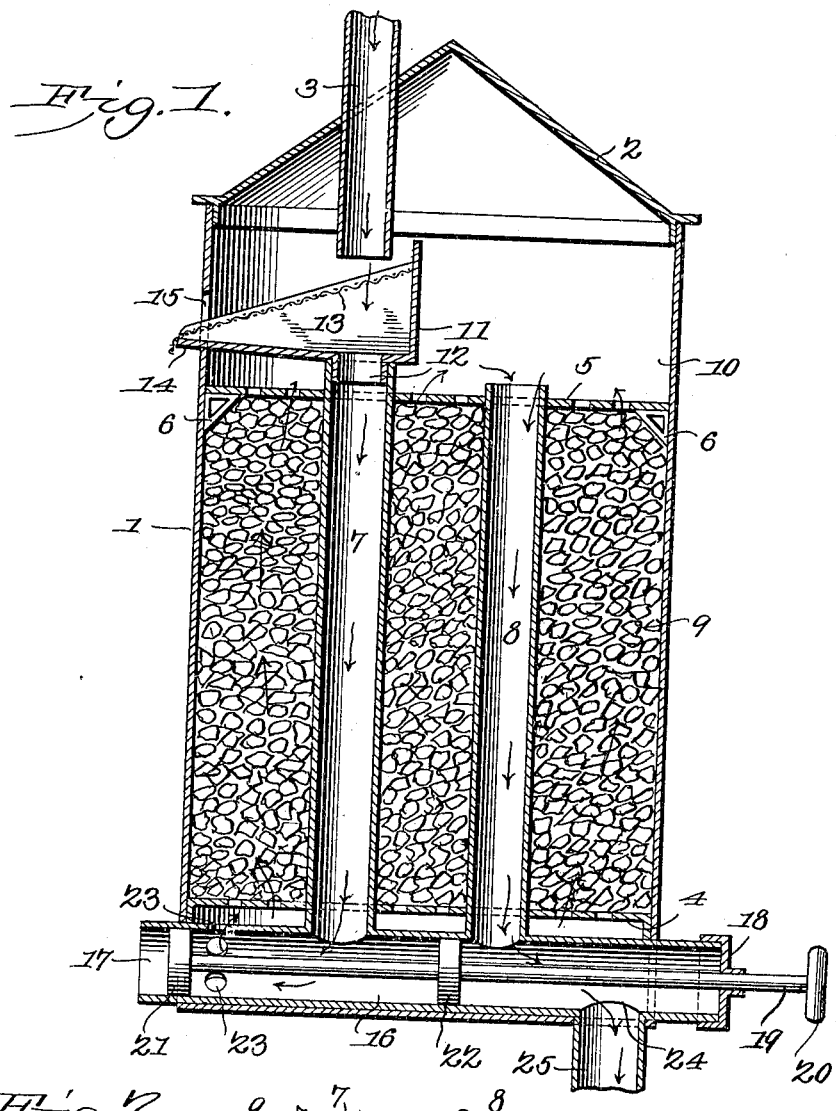
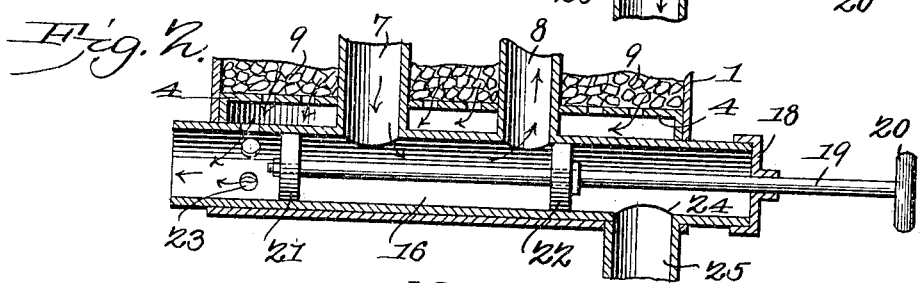
Witnesses
Moses L. S. Buckner
William T. Buckner Inventors
by C. A. Snow & Co. Attorneys

UNITED STATES PATENT OFFICE.

MOSES L. S. BUCKNER AND WILLIAM T. BUCKNER, OF SHELBYVILLE, KENTUCKY.

FILTER.

No. 818,868.     Specification of Letters Patent.     Patented April 24, 1906.

Application filed July 3, 1905. Serial No. 268,156.

*To all whom it may concern:*

Be it known that we, MOSES L. S. BUCKNER and WILLIAM T. BUCKNER, citizens of the United States, residing at Shelbyville, in the county of Shelby and State of Kentucky, have invented a new and useful Filter, of which the following is a specification.

This invention relates to filters, and is primarily designed to provide an improved device of this character which is particularly adapted for filtering rain-water collected from a roof prior to discharging the same into a cistern or storage-tank.

Another object of the invention is to effectually remove leaves and other trash from the water and to maintain the trash-separating screen free from accumulations of foreign matter.

A still further object of the invention is to provide for controlling the flow of water through the filter, so as to direct the same to the outlet leading to the cistern, and to run the water in another direction through the filter, so as to cleanse the filtering material and to carry off the dirty water through a suitable drain.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the accompanying drawings, Figure 1 is a vertical longitudinal sectional view of a filter embodying the features of the present invention. Fig. 2 is a detail sectional view, taken through the valve mechanism, showing the same adjusted for cleansing and draining the filter.

Like characters of reference designate corresponding parts in both figures of the drawings.

In carrying out the present invention there is provided a tank or receptacle 1, having a removable cover 2, which is pierced by an inlet-pipe 3, designed for communication with a down-spout. At a suitable distance above the bottom of the tank or receptacle there is a screen or perforate partition 4, and a similar screen or partition 5 is supported in the upper portion of the tank upon suitable brackets 6. In alinement with the inlet-pipe 3 there is a vertical pipe or passage 7, which pierces the two perforate partitions or screens 4 and 5, and at one side of this pipe there is another pipe 8, which also pierces the partitions 4 and 5. Suitable filtering material 9, such as charcoal or the like, is placed in the tank 1 between the partitions 4 and 5 and around the pipes 7 and 8.

The compartment 10 above the upper partition 5 is entirely free from filtering material and contains a hopper 11, arranged to receive the water passing through the inlet-pipe 3 and having its bottom provided with a short outlet-pipe 12, telescoped within the pipe 7, so as to support the hopper in position. A downwardly-inclined screen 13 is provided across the top of the hopper, so as to exclude leaves and other trash from passing downwardly through the pipe 7, said screen being inclined downwardly to the outer end portion 14 of the hopper, which projects through an opening 15 in one side of the tank, said opening being large enough to permit of the escape of the trash which is separated from the water by the inclined screen 13, which acts as a chute to effectually discharge the trash from the filter.

For controlling the passage of the water through the filter a valve-chamber 16 in the nature of a cylinder is provided in the bottom portion of the tank 1 below the partition 4, with its opposite ends projecting externally of the tank. One end 17 of this valve-chamber is open, and its opposite end is closed by a cap 18, through which works a valve-stem 19, having a suitable handle 20 upon its outer end and provided with spaced disk-shaped valves 21 and 22, which normally occupy the positions shown in Fig. 1. Adjacent the drain-terminal 17 of the valve-chamber and within the tank 1 said chamber is provided with an annular series of perforations 23, and adjacent the opposite end of the valve-chamber there is an outlet-opening 24 in communication with a pipe or passage 25, which leads to a cistern or storage-tank. (Not shown in the accompanying drawings.)

In practice, the valves being in the positions shown in Fig. 1, water entering the inlet-pipe 3 passes through the screen 13, which removes leaves and other trash, and the water passes on down through the pipe 7 into the valve-chamber 16, thence outward through the perforations 23 into the bottom of the tank 1 beneath the partition 4. The water then rises through the perforate partition 4 and through the filtering material until it reaches the upper compartment 10, whereupon it passes downwardly through the pipe or passage 8 into the rear end portion of the valve-chamber 16, and thence outwardly through the outlet 25. After the device has been in use for some time and it is desired to cleanse the filtering material the valve-stem is pulled rearwardly to bring the valves in the positions shown in Fig. 2, whereupon water entering the valve-chamber 16 through the pipe 7 rises through the pipe 8 into the upper compartment 10, and thence passes downwardly through the filtering material into the bottom portion of the tank below the lower partition 4, and thence outward through the perforations 23 and the open drain end 17 of the valve-chamber.

From the foregoing description it will be understood that leaves and other trash are always separated from the water in a simple and efficient manner, such trash being automatically discharged from the filter without requiring any manual handling thereof. Moreover, the water may be caused to flow through the filtering material in a reverse direction to the normal direction of flow for the purpose of agitating and stirring up the filtering material to loosen and carry off sediment through a drain-opening, the usual outlet for the filtered water being closed to prevent fouling of the filtered water in the cistern.

Having thus described the invention, what is claimed is—

1. In a filter, the combination of a tank having a pair of perforate partitions dividing the same into an intermediate and end compartments, the intermediate compartment being adapted to contain a filtering medium, a valve-chamber within one of the end compartments and provided with a drain-outlet and an outlet for filtered water, an inlet-pipe communicating with the other end compartment, a pipe communicating with the inlet-pipe and the valve-chamber, another pipe communicating between the valve-chamber and the opposite end compartment, a valve controlling the filtered-water outlet and the second-mentioned pipe, and another valve controlling the drain-outlet.

2. In a filter, the combination of a tank, a pair of perforate partitions dividing the same into an intermediate and opposite end compartments, the intermediate compartment being adapted to receive a filtering element, a valve-chamber in one of the end compartments, an inlet-pipe leading into the other end compartment, a main pipe communicating between the inlet-pipe and the valve-chamber, a branch pipe communicating between the valve-chamber and the opposite end compartment, the valve-chamber being provided at one end with a filtered-water outlet and at its opposite end with a drain-outlet there being an opening in the valve-chamber at the inner side of the drain-outlet to communicate with the adjacent end compartment, a valve-stem working in the valve-chamber, and spaced valves carried by the stem, one of the valves being arranged for controlling the opening which communicates with the valve-chamber and the adjacent end compartment and the other valve controlling the branch pipe and the filtered-water outlet.

3. In a filter, the combination of a tank having spaced perforate partitions dividing the same into an intermediate compartment and upper and lower end compartments, the intermediate compartment being adapted to contain a filtering element, a valve-chamber within the lower end compartment and provided with a drain-outlet and an outlet for the filtered water, an inlet-pipe leading to the upper end compartment, a hopper contained within the upper end compartment to receive the water from the inlet-pipe, an inclined screen carried by the hopper across the path of the incoming water, the upper compartment of the tank having a side opening through which the lower end of the screen projects to discharge trash therethrough, a main pipe leading from the hopper through the intermediate compartment to the valve-chamber, a branch pipe leading upwardly from the valve-chamber to the upper compartment, the valve-chamber being provided with an opening communicating with the adjacent end compartment adjacent the drain-outlet, a valve working in the valve-chamber and controlling the said opening, and another valve working in the valve-chamber and controlling the branch pipe and the outlet for filtered water.

In testimony that we claim the foregoing as our own we have hereto affixed our signatures in the presence of two witnesses.

MOSES L. S. BUCKNER.
WILLIAM T. BUCKNER.

Witnesses:
PHIL J. THOMPSON,
C. S. BASKETT.